United States Patent [19]

Jewell

[11] Patent Number: 4,953,339

[45] Date of Patent: Sep. 4, 1990

[54] DECK BRACKET FOR OF ATTACHING A DECK TO A BUILDING

[76] Inventor: Ricky S. Jewell, RFD #2, P.O. Box 4985, Mechanic Falls, Me. 04256

[21] Appl. No.: 301,322

[22] Filed: Jan. 24, 1989

Related U.S. Application Data

[62] Division of Ser. No. 139,968, Dec. 31, 1987, Pat. No. 4,811,542.

[51] Int. Cl.$^5$ .................................................. E04C 3/30
[52] U.S. Cl. ...................................... 52/729; 52/698; 248/300; 403/187
[58] Field of Search ................ 52/698, 702, 712, 715, 52/729; 248/300; 403/187

[56] References Cited

U.S. PATENT DOCUMENTS

| | | | |
|---|---|---|---|
| 1,767,575 | 6/1930 | Bujack | 248/300 X |
| 2,435,288 | 2/1948 | Nisenson | 248/300 |
| 3,407,547 | 10/1968 | Dole et al. | 52/729 X |
| 3,716,957 | 2/1973 | Bernardi | 52/633 |
| 3,827,209 | 8/1974 | Hobbs | 248/300 X |
| 3,921,356 | 11/1975 | Hughes | 52/299 |
| 4,453,363 | 6/1984 | Korles | 52/481 |
| 4,693,045 | 9/1987 | Rahaim et al. | 52/292 |
| 4,811,542 | 3/1989 | Sewell | 52/741 |

FOREIGN PATENT DOCUMENTS

| | | | |
|---|---|---|---|
| 2512154 | 10/1975 | Fed. Rep. of Germany | 52/112 |
| 611961 | 6/1979 | Switzerland | 52/772 |
| 717244 | 2/1980 | U.S.S.R. | 403/187 |

Primary Examiner—Carl D. Friedman
Assistant Examiner—Creighton Smith
Attorney, Agent, or Firm—Auslander & Thomas

[57] ABSTRACT

A deck bracket is provided for attaching a deck to a building. The deck bracket includes a wide flange and a narrow flange spaced away from each other by a web. The deck bracket is then easily joined to the building, preferably by screws, and the deck easily bolted to the deck bracket. The deck is thus spaced away from the building so that there can be no moisture accumulation.

3 Claims, 1 Drawing Sheet

U.S. Patent   Sep. 4, 1990   4,953,339
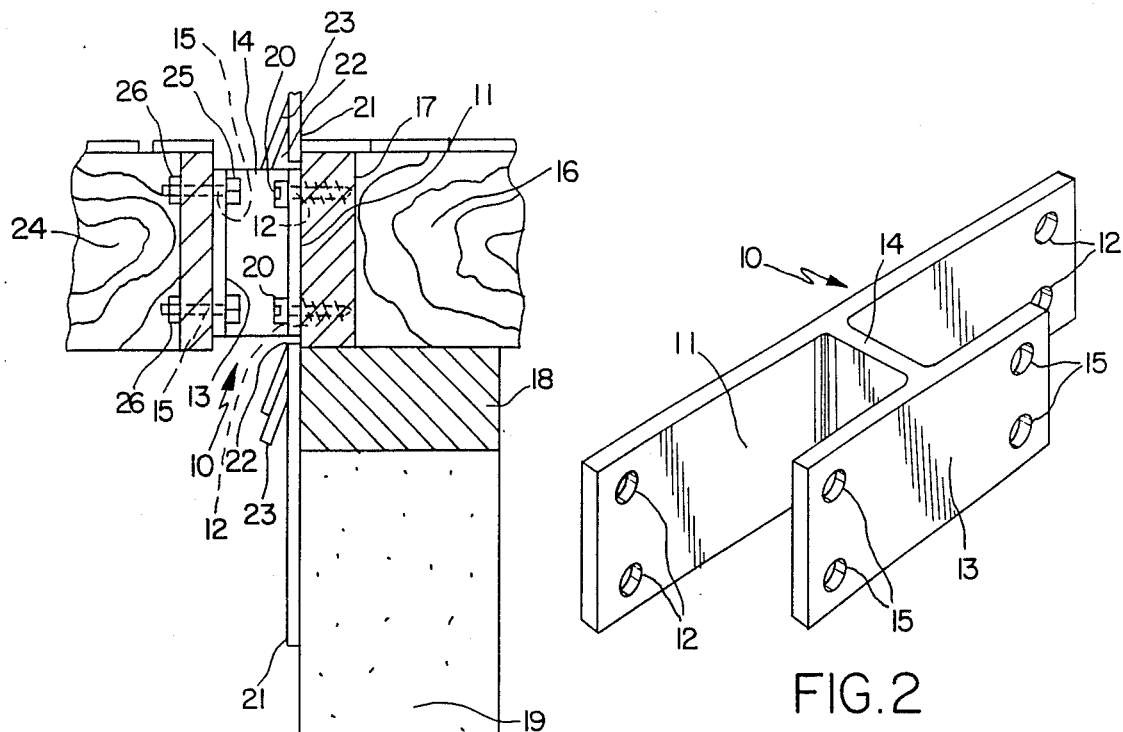
FIG. 2
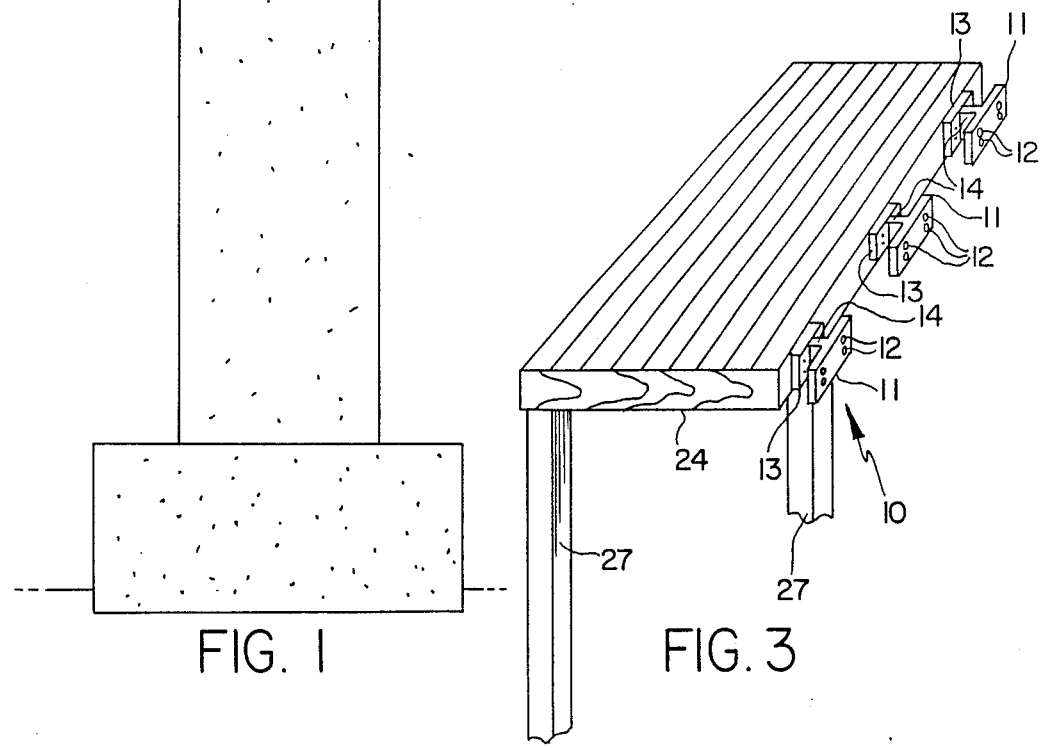
FIG. 1
FIG. 3

DECK BRACKET FOR OF ATTACHING A DECK TO A BUILDING

This application is a division of application Ser. No. 07/139,968, filed 12/31/87 now U.S. Pat. No. 4,111,542.

BACKGROUND OF THE INVENTION

This invention relates to a deck bracket for attaching a deck to a building. One of the problems in attaching a deck to a building, is that there is a risk that moisture may be trapped and accumulate at the point of attachment, and set up a situation where the wood at the joint is susceptible to rot. The present invention mounts the deck with a series of modified I-beam brackets, mounted on the floor joist, which spaces the deck away and enables the attachment of the deck free of the risk of accumulating moisture, either at the deck or at the floor joist.

With the deck bracket and method of the present invention the deck is erectable so that the brackets can be covered by siding and caulked at the floor joist, stopping the passage of undesirable moisture.

In the prior art, U.S. Pat. No. 3,716,957 discloses H-beam and I-beam structures used to support and space away and stiffen each other, utilizing conventional H-beam and I-beam configurations. The present invention, using a modified I-beam shape, adapts to bridge the connection of a wooden floor joist and a wooden deck in a manner employing the shape of the bracket to join the two portions, yet avoiding undesirable moisture accumulation of the prior art joining of deck and joist.

In the prior art, U.S. Pat. No. 3,921,356 discloses a structure for supporting decks, including a form of bracket. The structure, while adapted to support a deck, does not consider both the support of a wooden deck and the solution to the moisture problem at the joining of the joist and the deck.

The prior art seems to deal with structures which may effect a support without consideration of the structure in an environment that protects against moisture.

Accordingly, a primary object of the present invention is to provide a deck bracket for the support of a deck attached to a joist in an environment to protect against the accumulation of undesirable moisture.

Another object of the present invention is to provide a simple bracket which can economically be used to provide structural strength in an environment to protect against the accumulation of undesirable moisture.

Another object of the present invention is to provide a deck bracket to attach a deck in a way that siding can cover the flange of the bracket.

Another object of the present invention is to provide a deck bracket that may be caulked where the flange of the bracket meets the siding to prevent against the passage of undesirable moisture.

A BRIEF SUMMARY OF THE INVENTION

According to the present invention, a deck bracket for attaching a deck to a building with a series of modified I-beam brackets is provided for mounting a deck on a floor joist. The bracket spaces away the deck and enables the attachment of the deck free of the risk of accumulating moisture, either at the deck or at the floor joist. The deck bracket can be covered by siding and may be caulked at its flange where it meets the siding to protect against undesirable moisture accumulation.

The deck bracket includes a wide flange with its ends adapted to be mounted to a building therethrough, a narrow flange having means at its ends adapted to be mounted to a deck therethrough, and a web spacing apart the wide and narrow flanges. Preferably, the flanges and the web are integral with the web intermediate of the flanges. The mounting means at the flange ends may be openings.

A deck may be mounted on a building, whereby moisture cannot accumulate between the deck and the building, in a method including the steps of mounting the deck bracket to the building at the wide flange, caulking the deck bracket at said building, mounting the deck to the narrow flange and supporting said deck away from said building. Sheathing may be provided adjacent the wide flange with the deck bracket caulked adjacent the sheathing. Siding may be provided over the sheathing and at least partially cover the wide flange. The wide flange may be attached with screws and the narrow flange with bolts.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

BRIEF DESCRIPTION OF THE DRAWING

FIG. 1 is a side elevation of a deck and floor joist, partially in section, showing the deck bracket of the present invention joining a deck to the floor joist.

FIG. 2 is an isometric view of the deck bracket of the present invention.

FIG. 3 is an an isometric view of a deck on supports, including several deck brackets of the present invention.

Referring now to the figures in greater detail, where like reference numbers denote like parts in the various figures.

DETAILED DESCRIPTION

The deck bracket 10 of the present invention, as shown in FIGS. 1 through 3, comprises a wide flange 11 with openings 12 at its ends and a narrow flange 13 joined to the wide flange 11 by a web 14. The web 14 also has openings 15 at its ends.

In a preferred embodiment of the present invention, a floor joist 16 with a box sill 17 rests on a mud sill 18, supported on a foundation wall 19. The wide flange 11 is preferably screwed into the box sill 17 by screws 20 passing through the openings 12 in the wide flange 11. As can be seen in FIG. 1, sheathing 21 abuts the wide flange 11 on its sides. The wide flange 11 and the sheathing 21 are kept waterproof by caulking 22. The floor joist 16 and box sill 17 are further protected against accumulated moisture by siding 23 over the sheathing 21.

The deck joist 24 is preferably bolted to the narrow flange 13 by bolts 25 and nuts 26. As can be seen in FIG. 3, the deck joist 24 is conventionally supported on supports 27 at its other end.

In use, the deck bracket 10 is screwed, or otherwise mounted at the wide flange 11 on the box sill 17, with sheathing 21 abutting. The wide flange 11 is then caulked with caulking 22 to prevent the seepage of moisture which might damage the floor joist 16. The siding 23 can also cover the wide flange 11 and protect the floor joist 16 from getting any unwanted moisture. Caulking 22 is applied to the vertical end of the wide flange 11 between the wide flange 11 and where it meets the siding 23.

The width of the wide flange 11 over that of the narrow flange 13 renders easy access to the openings 12 for the mounting of the deck bracket 10 on the box sill 17. The configuration of the deck bracket 10 facilitates the use of screws 20 to mount the deck bracket 10 without any obstruction to the tools. The easy access of the underside of the deck joist 24, makes it easy to slip the bolts 25 through predrilled openings, to be bolted to the deck bracket 10. The narrow flange 13 provides adequate support to the deck. The web 14 spaces the deck joist 24 away from the floor joist 16, leaving a gap between the two that remains free of moisture. The gap does not allow any moisture to accumulate.

The number of deck brackets 10 to be employed depends on the strength of the building materials and the size of the deck. This is easily determined by any experienced builder. The deck bracket 10 might be made longer or wider, depending on the needs of the situation, for different application requirements. Basically few size variants should be required, since normally, a single size deck bracket 10 can be adapted by stacking them, or using as many as are deemed necessary, by adjusting the spacing of the deck brackets 10.

In a preferred embodiment, the deck bracket 10 is made of 3/16 inch steel.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. A deck bracket for mounting a deck horizontally to a building comprising a wide flange, said wide flange having openings at its ends adapted to mount said wide flange to a building therethrough, a narrow flange, said narrow flange having openings at its ends adapted to mount said narrow flange to a deck therethrough, a web, said web intermediate of said flanges, and said wide flange and said narrow flange being integral and spaced apart by said web.

2. The invention of claim 1 wherein said openings in said wide flange are positioned beyond the width of said narrow flange.

3. The invention of claim 1 wherein said space between said wide flange and said narrow flange is selected to provide access for installation of fixing means through said narrow flanges' openings to mount said narrow flange to a deck therethrough.

* * * * *